US011167728B2

(12) United States Patent
Jarasson et al.

(10) Patent No.: US 11,167,728 B2
(45) Date of Patent: Nov. 9, 2021

(54) WINDSHIELD WIPER ARM HAVING MEANS FOR RETAINING A FLUID DELIVERY TUBE

(71) Applicant: Valeo Systèmes d'Essuyage, Le Mesnil Saint Denis (FR)

(72) Inventors: Jean-Michel Jarasson, Le Mesnil Saint Denis (FR); Gérald Caillot, Le Mesnil Saint Denis (FR); Vincent Izabel, Le Mesnil Saint Denis (FR); Andrzej Rogala, Skawina (PL)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 170 days.

(21) Appl. No.: 16/006,251

(22) Filed: Jun. 12, 2018

(65) Prior Publication Data
US 2018/0354463 A1  Dec. 13, 2018

(30) Foreign Application Priority Data
Jun. 13, 2017  (EP) .................................. 17305717

(51) Int. Cl.
*B60S 1/34* (2006.01)
*B60S 1/46* (2006.01)
(Continued)

(52) U.S. Cl.
CPC ........... *B60S 1/3415* (2013.01); *B60S 1/3862* (2013.01); *B60S 1/46* (2013.01); *B60S 1/522* (2013.01)

(58) Field of Classification Search
CPC ........ B60S 1/3429; B60S 1/522; B60S 1/524; B60S 1/3862; B60S 1/3415; B60S 1/4038;
(Continued)

(56) References Cited

U.S. PATENT DOCUMENTS 3,827,101 A * 8/1974 Wubbe .................... B60S 1/522
15/250.04
8,522,393 B2 * 9/2013 Boland .................. B60S 1/3848
15/250.32
(Continued)

FOREIGN PATENT DOCUMENTS

CN      104276144 A     1/2015
CN      106488861 A     3/2017
(Continued)

OTHER PUBLICATIONS

Machine translation of description portion of German publication 102008021457, published Nov. 2009. (Year: 2009).*
(Continued)

*Primary Examiner* — Gary K. Graham
(74) *Attorney, Agent, or Firm* — Osha Bergman Watanabe & Burton LLP (57) ABSTRACT

The invention proposes an arm assembly comprising an arm adapter (20) comprising a distal section (20D) for supporting a wiper blade, a proximal section (20P) for housing a terminal section of a fluid delivery tube (26) and a terminal portion (21) for connecting the arm adapter (20) to a wiper arm rod (23), wherein the arm adapter (20) is provided with at least one retention device for fixedly retaining the terminal section of the fluid delivery tube with respect to said arm adapter, for example in the form of a retaining clip (32) attached to the proximal section (20P).

12 Claims, 5 Drawing Sheets

(51) Int. Cl.
 *B60S 1/38* (2006.01)
 *B60S 1/52* (2006.01)

(58) Field of Classification Search
 CPC .. B60S 1/4087; B60S 1/46; B60S 1/48; B60S 1/34; B60S 1/3409; B60S 1/365; B60S 1/3402
 USPC .......... 15/250.351, 250.04, 250.352, 250.34
 See application file for complete search history.

(56) References Cited

U.S. PATENT DOCUMENTS

2015/0113754 A1* 4/2015 Umeno ................. B60S 1/482 15/250.04
2017/0210343 A1* 7/2017 Horvath ................. B60S 1/40

FOREIGN PATENT DOCUMENTS

| | | | |
|---|---|---|---|
| DE | 10 2008 021457 A1 | | 11/2009 |
| DE | 10 2013 103278 A1 | | 10/2014 |
| DE | 102014214109 | * | 1/2016 |
| EP | 2705993 A2 | | 3/2014 |
| JP | 2006-7971 | * | 1/2006 |
| WO | 2009132982 A1 | | 11/2009 |
| WO | WO 2016/008852 | * | 1/2016 |

OTHER PUBLICATIONS

Machine translation of description portion of Japanese publication 2006-007971, published Jan. 2006. (Year: 2006).*
Office Action in corresponding European Application No. 17305717.5, dated Dec. 17, 2019 (4 pages).
First Office Action in corresponding Chinese Application No. 201810608554.8, dated Jan. 29, 2021 (12 pages).

* cited by examiner

WINDSHIELD WIPER ARM HAVING MEANS FOR RETAINING A FLUID DELIVERY TUBE

TECHNICAL FIELD OF THE INVENTION

The present invention relates to an arm assembly for a windshield wiper arm for supporting a wiper blade equipped with a fluid delivery tube.

The invention also relates to a windshield wiper arm comprising such an arm assembly.

TECHNICAL BACKGROUND OF THE INVENTION

A car or an automotive vehicle is traditionally equipped with wipers to clean the external surface of the windscreen or of any other glass component, and to prevent the driver's view of his surroundings being obstructed.

A windscreen wiper generally includes a wiper arm which moves back and forth in an angular manner, and a longitudinally extended wiper blade.

The wiper blade carries a squeegee blade made of a resilient material that rubs against the windscreen external surface and removes water by moving it outside the driver's field of vision.

In a conventional version, the blades are produced in the form of articulated brackets which hold the squeegee blade at a number of discrete locations, giving it a bend that allows it to follow whatever curvature the windscreen may have.

In an other and more recent version, known as the "flat blade" version, the blade is in the form of a semi-rigid assembly which holds the squeegee blade along its entire length by virtue of one or more bend-forming vertebrae making it possible to press the blade against the windscreen without having to use brackets.

In both solutions, the blade is attached to the wiper arm by a connection system having a connector and an adapter.

The connector is a piece which is secured to the blade and which is generally fastened directly to the squeegee blade or to the flat structure of the blade, whereas the adapter is interposed between the connector and the arm.

The adapter is an intermediate piece that allows the linking and the fastening of the connector on the wiper arm and which is locked in a terminal piece of the wiper arm by a retractable locking means.

In order to improve the cleaning of the surface, the wiper arm assembly may include at least one fluid delivery tube or hose for distributing and dispersing a windshield washer cleaning fluid.

Such a tube or hose can also deliver a deicing fluid.

The terminal end or free end of the tube or hose is generally connected to a spraying device, supported by the wiper arm, for spraying the fluid on the windshield wiper surface.

Advantageously, in such an arrangement, the liquid is sprayed as closed as possible to the wiper blade.

It is thus necessary to arrange the fluid delivery tube along the windshield wiper arm.

To this end, it is known to design an arm assembly for a windshield wiper arm comprising an arm adapter comprising a distal section for supporting the wiper blade and a proximal section delimiting an internal space, for example formed as a substantially open channel of a U-shaped cross section delimiting an internal space for housing a terminal end of the fluid delivery tube.

To hold firmly the tube or hose on the arm, it is known to provide one or several clips for fixing it along the rod of the wiper arm.

The aim of the invention is to provide a solution to ensure a good locking of the tube or hose on the arm and also to protect the hose or tube from any bad handling by the end-user, for example when grabbing the arm-blade connection for dismounting the wiper blade and replacing it with a new wiper blade.

SUMMARY OF THE INVENTION

To this end, the invention proposes an arm assembly for a windshield wiper arm for supporting a wiper blade, said arm assembly comprising an arm adapter comprising a distal section for supporting a wiper blade, a proximal section delimiting an internal space for housing a terminal end of a fluid delivery tube, and a terminal portion for connecting said arm adapter to a rod of the wiper arm, wherein said arm adapter is provided with at least one retention device for fixedly retaining the terminal end of the fluid delivery tube with respect to said arm adapter.

This solution makes it possible to maintain and fix the terminal end of the fluid delivery tube as close as possible to the connection system, and also to reduce the length of the so-called loop terminal portion of the fluid delivery tube that extends between the last fixed point or zone of the tube and its free end connected for example to a spraying nozzle.

The reduction of this length provides with a reduction of the risks of bad handling consequences during replacement of the wiper blade.

According to other aspects of the invention:
said retention device is positioned as close as possible to the distal section of the arm adapter;
said proximal section comprises at least one lateral wall;
said at least one retention device comprises a retaining tab integral with said at least one lateral wall;
said at least one retention device comprises a retaining clip attached to said proximal section;
said retaining clip is attached to at least one locking shape of the proximal section;
the arm assembly comprises the rod of the wiper arm, wherein said rod is fixed to the terminal portion of the arm adapter and comprises a terminal distal portion that extends in the internal space of the proximal section of the arm adapter, said terminal distal portion of the rod comprising the at least one locking shape and/or being provided with a retention clip;
said arm adapter has a substantially longitudinal orientation, and wherein said proximal section is laterally offset with respect to said distal section of said arm adapter.

The invention also proposes a windshield wiper arm comprising an arm assembly according to the invention.

DESCRIPTION OF THE FIGURES

The invention will be better understood and further details, features and advantages of the invention will become apparent from reading the following description given by way of non-limiting example and with reference to the appended drawings, in which:

FIG. 2 is a bottom perspective view partially illustrating the arm rod, the arm adapter the fluid delivery tube of FIG.

1 associated with a spraying device connected to the fluid delivery tube and supported by the arm adapter;

DETAILED DESCRIPTION

In the following description, identical reference numbers denote identical pieces or pieces having similar functions.

It should be noted that the figures explain the invention in detail for implementing the invention, it being, of course, possible for said figures to serve to better define the invention if necessary.

Furthermore, in the following description, the terms 'longitudinal' or 'lateral' refer to the orientation of the windscreen wiper blade or of the wiper arm according to the invention.

For the purposes of satisfactory comprehension of the invention, the figures may be oriented with reference to the 'X-Y-Z' scheme.

The longitudinal direction corresponds to the main axis (X) of the windscreen wiper blade, while the transverse (Y) and vertical (Z) orientations correspond to concurrent lines, that is, lines which cross the longitudinal direction, notably perpendicular to the longitudinal axis of the windscreen wiper blade.

The longitudinal axis X is oriented from the distal end of the windscreen wiper towards its distal end.

The directions referenced 'upper' or 'lower' correspond to orientations perpendicular to the plane of rotation of the windscreen wiper blade, the term 'lower' being turned towards the plane of the windscreen and the term 'upper' being turned away from this plane.

Figure 1:
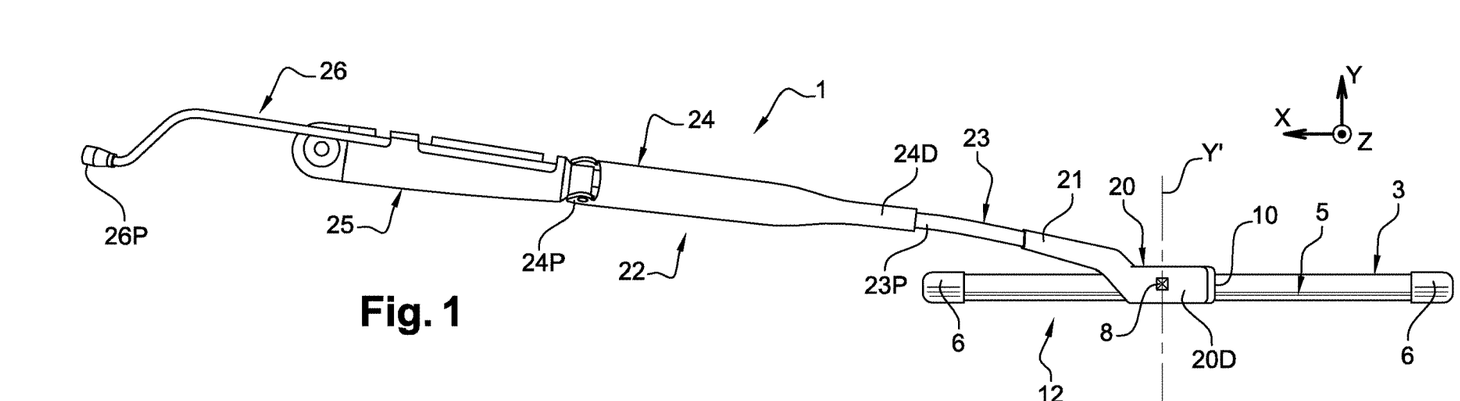
FIG. 1 is a top view of a windscreen wiper, this windscreen wiper having a windscreen wiper blade, a wiper arm for driving the wiper blade including an arm rod and an arm adapter, and a fluid delivery tube.

FIG. 1 illustrates a windscreen wiper 1 having a windscreen wiper blade 12 and a wiper arm 22 for driving the windscreen wiper blade 12.

The windscreen wiper blade 12 is here of the flat blade type and comprises a longitudinal body 3 oriented substantially in accordance with the longitudinal axis X, a squeegee blade, generally made of rubber or of elastomeric material, and at least one vertebra (not illustrated) that stiffens the squeegee blade and encourages it to press against a vehicle windscreen.

The body 3 of the windscreen wiper blade 12 may comprise an upper aerodynamic deflector 5 intended to improve the operation of the wiping system, the purpose of this deflector being to improve the pressing of the windscreen wiper blade against the windscreen and thus the aerodynamic performance of the windscreen wiper.

The windscreen wiper blade 12 may further comprise end fittings 6 or clips for attaching the squeegee blade and the vertebra to the body 3, these fittings 6 being arranged at each of the longitudinal ends of the body 3.

Substantially at its middle, the windscreen wiper blade 12 comprises, an intermediate connector (not visible); and an adapter element 10 forming an adapter secured to the wiper arm 22 that is mounted on the connector so as to maintain a degree of freedom to pivot about a rotation axis Y' that is a transverse axis parallel to a transverse direction Y substantially perpendicular to the longitudinal axis X of the windscreen wiper blade 12.

This degree of freedom allows the windscreen wiper blade 12 to pivot with respect to the wiper arm 22 and thus allows the windscreen wiper blade 12 to follow the curvature of the windscreen as it moves. The adapter element 10 is designed in order to be mounted by translation along with the longitudinal direction X inside a terminal distal piece 20 of the wiper arm 22, from which it may be detached by pressing on a locking button 8.

This terminal piece 20 is the arm adapter in the sense of the invention.

The wiper arm 22 is intended to be driven by a motor to follow an angular back-and-forth movement that allows water and possibly other undesirable elements with which the windscreen is covered to be evacuated.

The arm adapter element 10 provides for the connection of the windscreen wiper blade 12 to the wiper arm 22 and, in particular, to the arm adapter piece 20 of the wiper arm 22.

The arm adapter 20 comprises a distal section 20D and a proximal section 20P.

In the illustrated example, the distal section 20D of the arm adapter 20 forms a yoke having a vertical and transverse section substantially in the form of a reversed U.

The distal section 20D, that accommodates the adapter element 10, has an elongate shape, the axis of elongation of which is generally substantially parallel or coaxial to the longitudinal axis X of the windscreen wiper blade 12. In the remainder of the present description, in a non limiting manner, the axis of elongation of the distal section 20D of the arm adapter 20 will be deemed to correspond to the axis X.

The proximal section 20P has an elongate overall shape and extends substantially parallel to the axis X and that is laterally offset with respect to the longitudinal axis X of the distal section 20D, as it can be seen at FIG. 1.

Beyond its proximal section 20P, the arm adapter comprises a terminal portion 21 for connecting the arm adapter 20 to a rod of the wiper arm 22 belonging to the rest of the wiper arm 22.

As shown in FIG. 1, the terminal portion 21 has an elongate overall shape that is laterally offset with respect to the longitudinal axis X of the distal section 20D.

For example, both the rod 23 and the arm adapter are metallic components and the terminal portion 21 is mechanically crimped on the arm rod 23.

Figure 2:
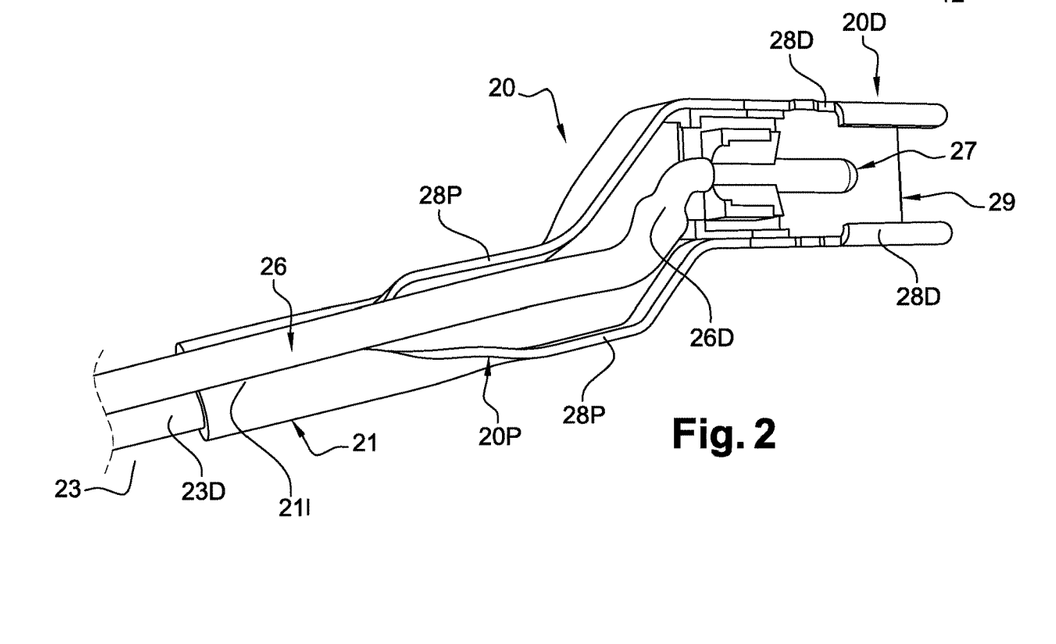
Figures 3, 4:
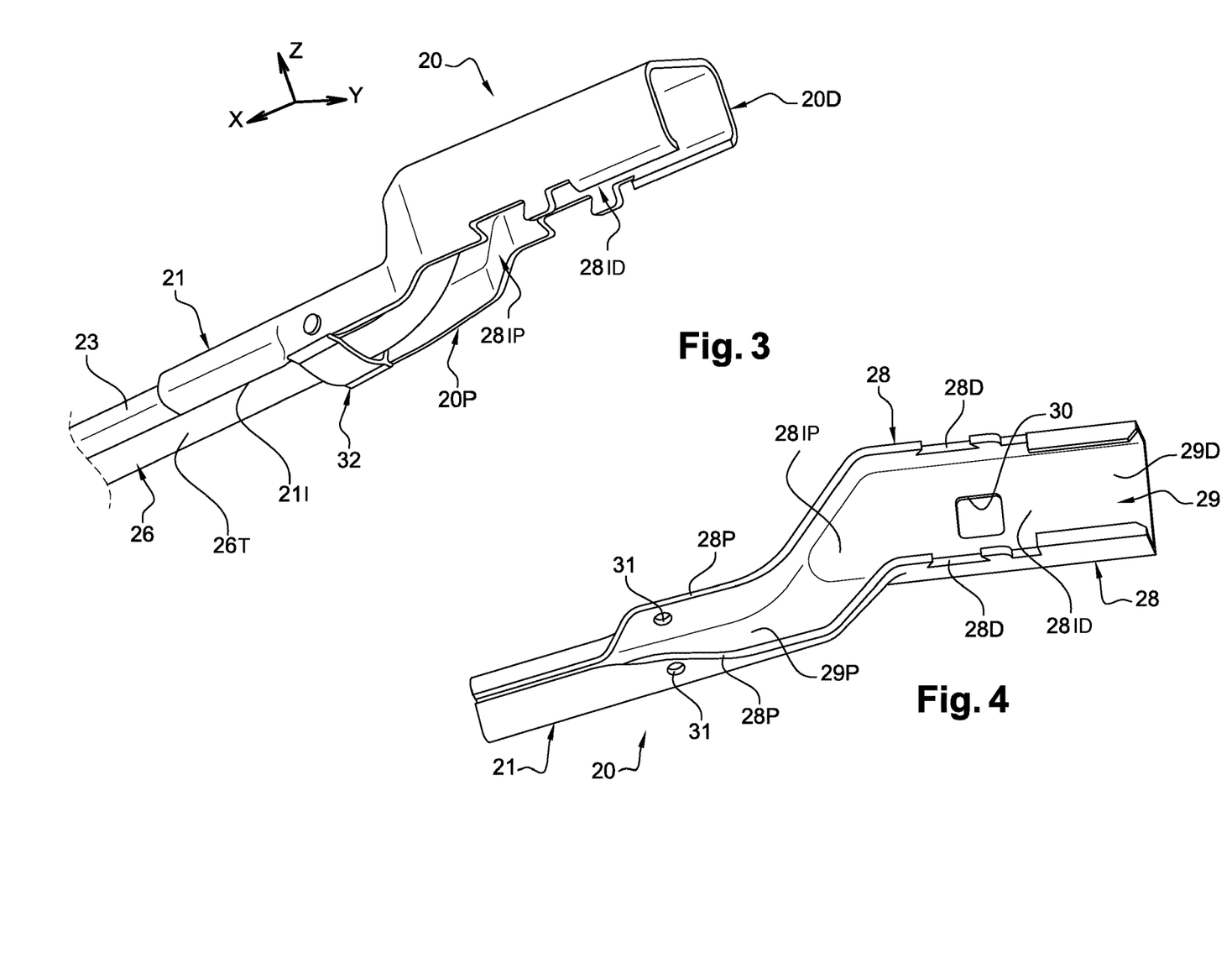
FIG. 3 is a view that is similar to the one of FIG. 2 and that illustrates a first embodiment of a retention device for fixedly retaining the terminal end of the fluid delivery tube with respect to the arm adapter.
FIG. 4 is a bottom perspective view of the arm adapter of FIG. 3 including retention means.

The rest of the wiper arm comprises an arm rod 23 having a terminal distal end 23D that is rigidly fixed to terminal portion 21 of the arm adapter 20 as it can be seen in details at FIGS. 2 and 3. As shown in FIGS. 2 and 3, the terminal portion 21 includes a terminal internal space 211 configured for covering a tube or a hose.

The proximal end 23P of the arm rod 23 is rigidly fixed to the distal end 24D of a retainer 24. The proximal end 24P of the retainer 24 is supported by and articulated on a mounting and driving pivoting head 25.

The windscreen wiper 1 is equipped with a fluid, for example a windshield cleaning liquid, delivery tube or hose 26 that extends all along the wiper arm.

The delivery tube 26 is a flexible tube, for example made of elastomeric material, that extends from its free proximal end 26P to its free distal end 26D.

The proximal end 26P of the delivery tube 26 is designed to be connected to a complementary component of a non illustrated fluid delivery system.

As it can be seen at FIG. 2, the distal free end 26D of the delivery tube 26 is designed to be connected to a complementary portion of a spraying nozzle 27 arranged in the interior of the distal section 20D of the arm adapter 20 that accommodates the adapter element 10.

As it can be seen at FIG. 3, the delivery tube 26 runs along an under face of the arm rod 23 and an under face of the arm adapted 20. The delivery tube 26 includes a terminal end 26T and the distal end 26D, which extend respectively inside space delimited firstly within the proximal section 20P and secondly within the distal section 20D of the arm adapter 20.

With reference to FIGS. 2 and 3, the arm adapter 20 comprises two opposed lateral walls 28 each one having a proximal section 28P and a distal section 28D respectively associated with the proximal and distal portions 20P, 20D of the arm adapter 20.

These two lateral walls are connected together by an upper transverse wall 29 comprising a proximal section 29P and a distal section 29D respectively associated with the proximal and distal portions 20P, 20D of the arm adapter 20.

The proximal section 28P delimits a proximal internal space 281P of the arm adapter 20. The distal section 28D delimits a distal internal space 281D of the arm adapter 20. The proximal internal space 281P and the distal internal space 281D are internal spaces corresponding to the space where the terminal end 26T and distal end 26D of the delivery tube 26 extend.

As shown in FIG. 3, the delivery tube 26 extends from the terminal internal space 211 to the distal internal space 281D.

The distal section 29D of the upper wall 29 comprises a through hole 30 for giving access to the unlocking button 8.

According to the invention, the arm adapter 20 is provided with retention means for fixedly retaining the terminal end 26T of the fluid delivery tube 26 with respect to the arm adapter 20.

In the first embodiment, these retention means are in the form of a retention clip that is elastically mounted between the terminal portions of the proximal sections 28P of the lateral walls 28.

To this end, each proximal section comprises a transversal through hole 31, the two holes 31 being transversely aligned.

Figure 6:
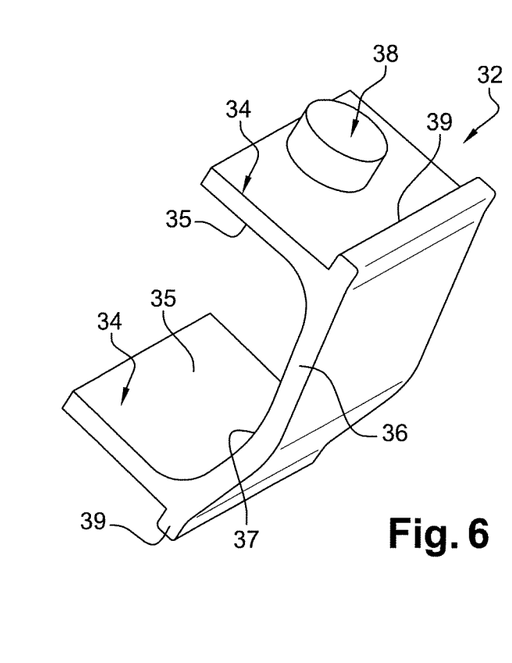
FIG. 6 is a detailed enlarged perspective view of the retention clip of FIGS. 3 and 5.

The retention clip 32 is here in the form of a plastic molded piece having a general shape of an open "ring".

The retention clip comprises two lateral vertical and parallel planar wings 34 that are connected together by a lower substantially V shaped longitudinal wall 36.

For its mounting and fixation to the proximal section 20P of the arm adapter 20, each external face 33 of the lateral wings is provided with a transversal prong 38 designed to be received in an associated hole 31.

The positioning and fixture of the retention clip 32 is provided with two laterally and longitudinally extending fins 39 that cooperate with the lower edges of the proximal sections 28P of the lateral walls 28.

The retention clip 32 is mounted on the proximal section 20P of the arm adapter 20 by elastic deformation of its lateral wings 34 for introducing each prong 38 in its associated hole 31.

The internal faces 35 of the lateral wings 34 and 37 of the lower wall 36 delimitate an internal space for receiving a corresponding portion of the terminal end 26T of the delivery tube 26 that extends between the proximal sections 28P of the lateral walls 28.

Figure 5:
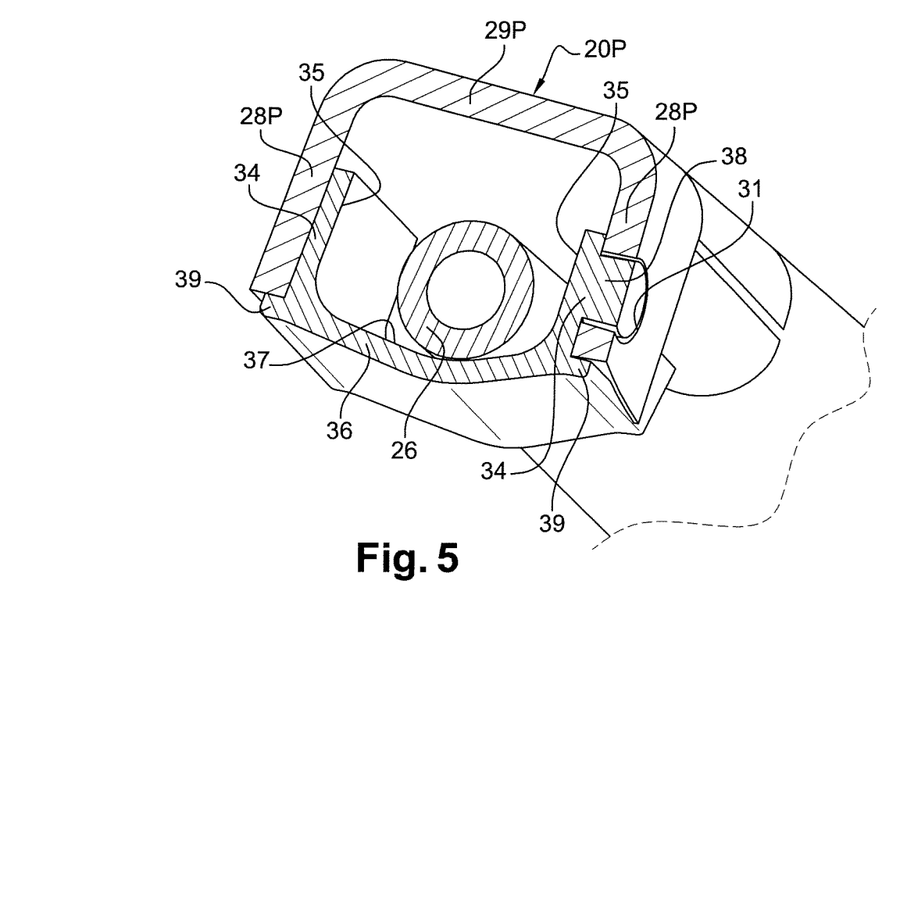
FIG. 5 is a detailed enlarged cross-sectional view of the components of the assembly of FIG. 3 along a vertical and transversal plane.

Thus, as illustrated at FIGS. 3 and 5, this portion of the terminal end 26T of the delivery tube 26 is "trapped" inside the proximal section 20P of the arm adapter 20 and is retained inside by the retention clip 32.

According to an non illustrated variant of this embodiment, the internal faces of the retention clip 32 can be provided with any convenient elements for gripping or plying the said portion of the terminal end 26T of the delivery tube 26.

Figure 7:
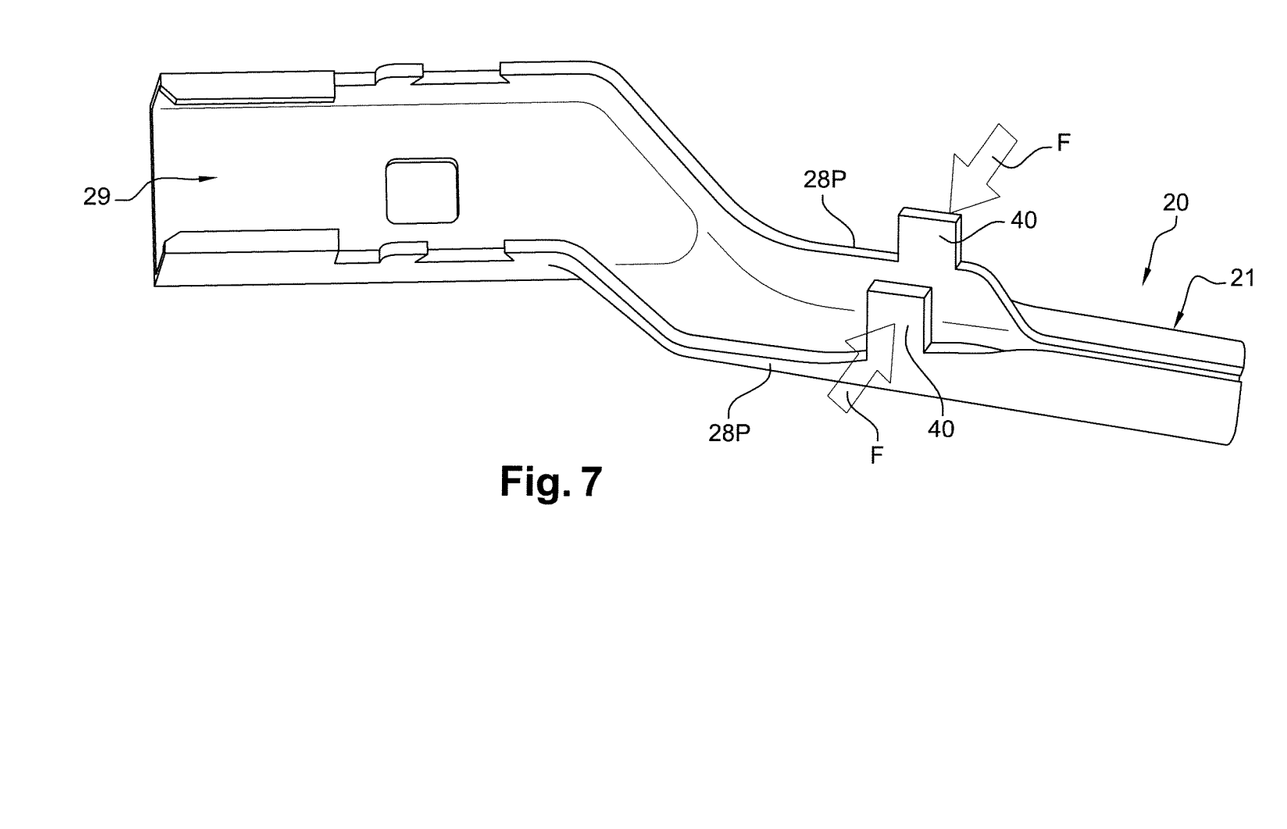
FIG. 7 is a bottom perspective view of an arm adapter that illustrates a second embodiment of a retention device for fixedly retaining the terminal end of the fluid delivery tube with respect to the arm adapter.

According to the second embodiment illustrated at FIG. 7, the delivery tube retention means are in the form of at least one a retention tab 40 that is designed to cooperate with a corresponding portion of the terminal end 26T of the delivery tube 26 that extends between the proximal sections 28P of the lateral walls 28.

In a non limiting manner, each one of the proximal sections 28P of the lateral walls 28 is provided with a retention tab 40.

Each retention tab 40 is made as a single piece with its associated lateral wall 28-28P. To this end, each tab 40 is integrally formed from one of the walls.

At FIG. 7, each retention tab 40 is in its original non bent state in which it extends substantially in the vertical plane of its associated wall 28-28P.

Each retention tab 40 can be plastically deformed and bent—as indicated by the arrows "F" in order to extend substantially horizontally to define a longitudinal wall playing the same role as the wall 36 of the retaining clip 32 in order to delimitate an internal space for receiving a corresponding portion of the terminal end 26T of the delivery tube 26 that extends between the proximal sections 28P of the lateral walls 28.

Thus, this portion of the terminal end 26T of the delivery tube 26 will be "trapped" inside the proximal section 20P of the arm adapter 20 and retained inside by the retention tabs 40.

Each tab can be bent in order to slightly crimp the said corresponding portion of the terminal end 26T of the delivery tube 26.

Within the scope of the invention, the number and position of the retention tabs 40 may vary along the proximal section 20P of the arm adapter 20, for instance comprising two longitudinally spaced retention tabs one lateral wall and a third retention tab on the other lateral wall and intercalated between the two other ones.

Figure 8A:
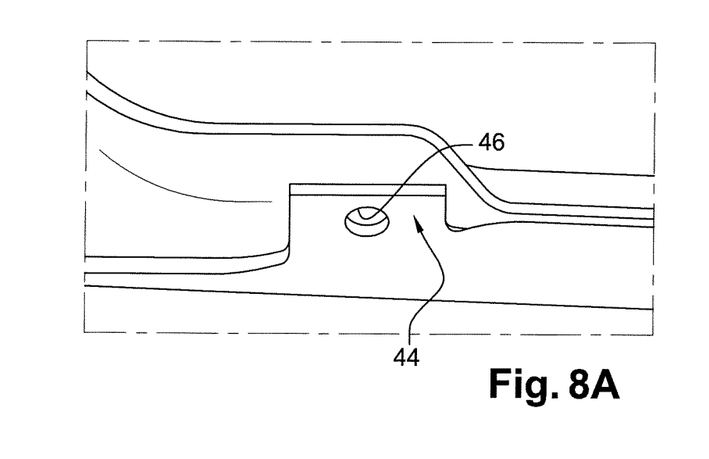
FIG. 8A is a bottom perspective view of an arm adapter that illustrates a third embodiment of a retention device for fixedly retaining the terminal end of the fluid delivery tube with respect to the arm adapter and FIG. 8B illustrates an associated retention clip.
Figure 8B:
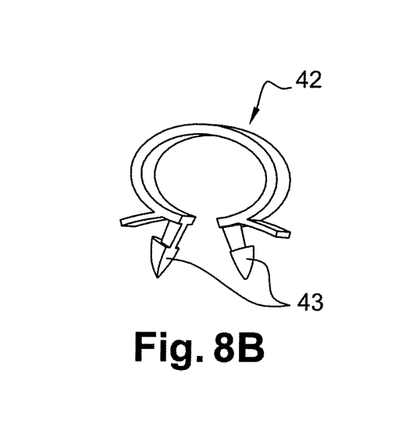

According to the third embodiment illustrated at FIGS. 8A and 8B, the delivery tube retention means are in the form of at least one a retention clip 42 fixed on a tab 44 of the proximal section 20P of the arm adapter 20.

The retention clip 42 is designed to cooperate with a corresponding portion of the terminal end 26T of the delivery tube 26 that extends between the proximal sections 28P of the lateral walls 28.

In a non limiting manner, only one of the proximal sections 28P of the lateral walls 28 is provided with a retention clip mounting tab 44 supporting a retention clip 42.

The retention clip 42 is for example an open ring shaped clip delimiting an internal circular space for receiving a portion of the delivery tube 26.

The retention clip 46 is radially open for permitting the transversal mounting of the delivery tube inside the retention clip 42.

The body of the delivery tube can freely slide through the retention clip 42 or, alternatively, be slightly radially crimped by the retention clip 42 when the latter is fixed on the mounting tab.

The fixing of the retention clip 42 is ensured for example by means of the two parts ankle 43 to be elastically inserted and anchored in the hole 46.

The mounting tab 44 is made as a single piece with its associated lateral wall 28-28P. To this end, the tab 44 is integrally formed from one of the walls.

At FIG. 8A, the mounting tab 44 is in its original non bent state in which it extends substantially in the vertical plane of its associated wall 28-28P.

After having mounted the delivery tube 26 and the clip 42 on the mounting tab 44, the mounting tab 44 can be plastically deformed and bent in order to extend substantially horizontally to occupy an operational position fir having the retention clip 42 playing the same role as the retaining clip 32 in order position and maintain the retention clip 42 and the terminal end 26T of the delivery tube 26 between the proximal sections 28P of the lateral walls 28.

Figure 9A:
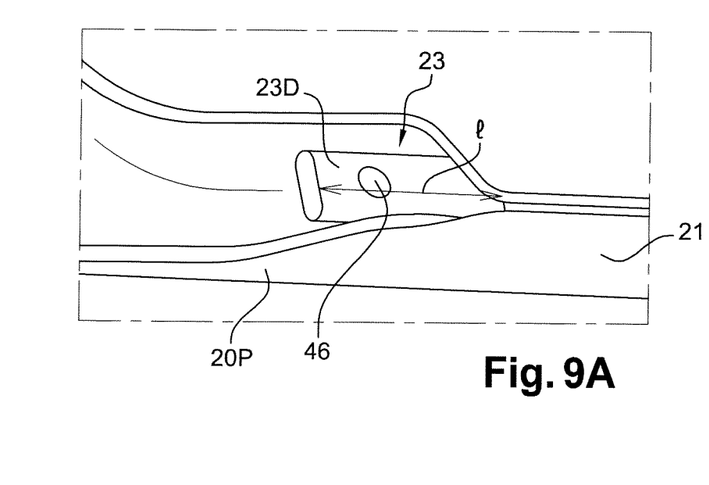
FIG. 9A is a bottom perspective view of an arm adapter that illustrates a fourth embodiment of a retention device for fixedly retaining the terminal end of the fluid delivery tube with respect to the arm rod associated with the arm adapter.
Figure 9B:
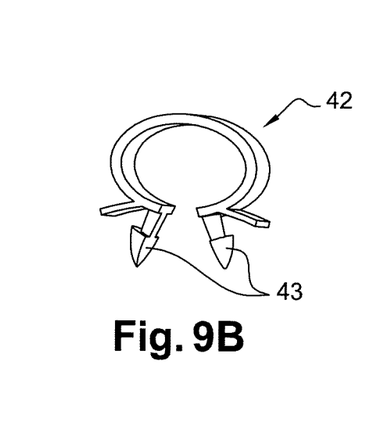
FIG. 9B illustrates an associated retention clip.

According to the fourth embodiment illustrated at FIGS. 9A and 9B, the delivery tube retention means are in the form of at least one a retention clip 42 fixed on the terminal distal portion 23D of the rod arm 23 that extends longitudinally in the internal space of the proximal section 20P of the arm adapter 20.

The design of the retention clip 42 is similar to the one described in reference to the third embodiment For positioning and fixing the retention clip 42, the terminal distal portion 23D of the rod 23 comprises a mounting hole 46 for receiving the ankle 43.

In this embodiment, the overall length of the arm rod is advantageously greater than in the prior art such that the terminal distal portion 23D presents a sufficient length "l" extending inside the internal space of the proximal section 20P of the arm adapter to be provided with the mounting hole 46.

The length "l" of the terminal distal portion 23D is in particular comprised between 15 mm and 50 mm, even more comprised between 18 mm and 40 mm. For example the length "l" of the terminal distal portion 23D is equal to 20 mm.

According to a non illustrated variant, the terminal distal portion 23D of the rod arm 23 may directly include a delivery tube retention shape, for example in the shape of a hook.

According to an additional non illustrated embodiment or in addition to any of the preceding claims, the retention means may include a bottom or lower retention cap attached to the proximal section and or to the rest of the arm and at least partially closing the internal space of said proximal section of the arm adapter

The invention claimed is:

1. An arm assembly for a windshield wiper arm for supporting a wiper blade, said arm assembly comprising:
a fluid delivery tube that is a flexible tube that extends from a free proximal end to a free distal end,
an arm adapter comprising a distal section for supporting the wiper blade, a proximal section for housing a terminal end of the fluid delivery tube, and a terminal portion for connecting said arm adapter to a rod of the wiper arm, and
a spraying nozzle connected to the free distal end of the fluid delivery tube,
wherein said arm adapter is provided with at least one retention device for fixedly retaining the terminal end of the fluid delivery tube with respect to said arm adapter,
wherein the fluid delivery tube is sandwiched between the proximal section of the arm adapter and the retention device,
wherein the fluid delivery tube runs along an under face of the rod and an under face of the arm adapter,
wherein the fluid delivery tube extends from a terminal internal space in the proximal section to a distal internal space in the distal section of the arm adapter,
wherein the distal section is laterally offset with respect to the proximal section and the terminal portion of the arm adapter, and
wherein the spraying nozzle is contained within the distal internal space of the arm adapter.

2. The arm assembly according to claim 1, wherein said retention device is positioned on the proximal section and between the terminal portion and the distal section of the arm adapter.

3. The arm assembly according to claim 1, wherein said proximal section comprises at least one lateral wall.

4. The arm assembly according to claim 3, wherein said at least one retention device comprises at least one retaining tab integral with said at least one lateral wall.

5. The arm assembly according to claim 1,
wherein the proximal section comprises at least one locking shape for attaching a retaining clip of the at least one retention device,
wherein the retention clip is provided with two laterally and longitudinally extending fins that cooperate with lower edges of the proximal section, and
wherein the retention clip is mounted on the proximal section by elastic deformation of two lateral wings for introducing corresponding prongs into associated holes.

6. The arm assembly according to claim 1, wherein said arm assembly comprises the rod of the wiper arm fixed to the terminal portion of the arm adapter.

7. The arm assembly according to claim 6, wherein said rod comprises a terminal distal portion that extends in the internal space of the proximal section of the arm adapter, said terminal distal portion of the rod comprising at least one locking shape and/or being provided with a retention clip.

8. The arm assembly according to claim 7, wherein said terminal distal portion comprises a mounting hole.

9. The arm assembly according to claim 8, wherein a length L of the terminal distal portion is between 18 mm and 40 mm, inclusive.

10. The arm assembly according to claim 1, wherein said arm adapter has a substantially longitudinal orientation.

11. A windshield wiper arm comprising the arm assembly according to claim 1.

12. An arm assembly for a windshield wiper arm for supporting a wiper blade, said arm assembly comprising:
a fluid delivery tube that is a flexible tube that extends from a free proximal end to a free distal end,
an arm adapter comprising a distal section for supporting the wiper blade, a proximal section for housing a terminal end of the fluid delivery tube, and a terminal portion for connecting said arm adapter to a rod of the wiper arm, and a spraying nozzle connected to the free distal end of the fluid delivery tube, wherein said arm adapter is provided with at least one retention device for fixedly retaining the terminal end of the fluid delivery tube with respect to said arm adapter, wherein the fluid delivery tube runs longitudinally along a center of an under face of the arm adapter, wherein the fluid delivery tube runs along an under face of the rod and an under face of the arm adapter, wherein the fluid delivery tube extends from a terminal internal space in the proximal section to a distal internal space in the distal section, wherein the distal section is laterally offset with respect to the proximal section and the terminal portion of the arm adapter, and wherein the spraying nozzle is contained within the distal internal space of the arm adapter.

* * * * *